US006374280B1

(12) United States Patent
Li

(10) Patent No.: US 6,374,280 B1
(45) Date of Patent: Apr. 16, 2002

(54) COMPUTATIONALLY EFFICIENT INVERSE DISCRETE COSINE TRANSFORM METHOD AND APPARATUS

(75) Inventor: Shipeng Li, Princeton, NJ (US)

(73) Assignees: Sarnoff Corporation, Princeton, NJ (US); Motorola, Inc., Schaumburg, IL (US)

(*) Notice: Subject to any disclaimer, the term of this patent is extended or adjusted under 35 U.S.C. 154(b) by 0 days.

(21) Appl. No.: 09/153,717

(22) Filed: Sep. 15, 1998

Related U.S. Application Data

(60) Provisional application No. 60/084,632, filed on May 7, 1998.

(51) Int. Cl.[7] .............................................. G06F 17/14

(52) U.S. Cl. ...................................................... 708/402

(58) Field of Search ................................ 708/400–402

(56) References Cited

U.S. PATENT DOCUMENTS 5,181,183 A * 1/1993 Miyazaki .................... 708/402
5,748,514 A * 5/1998 Okada et al. ............... 708/402
5,781,239 A 7/1998 Mattela et al. ............. 348/415

OTHER PUBLICATIONS

"Fast Algorithms for the Discrete W Transform and for the Discrete Fourier Transform", Z. Wang, IEEE Transactions on Acoustics, Speech, and Signal Processing, vol. ASSP–32, No. 4, Aug. 1984. pp. 803–816.

* cited by examiner

*Primary Examiner*—Tan V. Mai
(74) *Attorney, Agent, or Firm*—William J. Burke

(57) ABSTRACT

A method and apparatus for efficiently computing an Inverse Discrete Cosine Transform (IDCT).

13 Claims, 7 Drawing Sheets

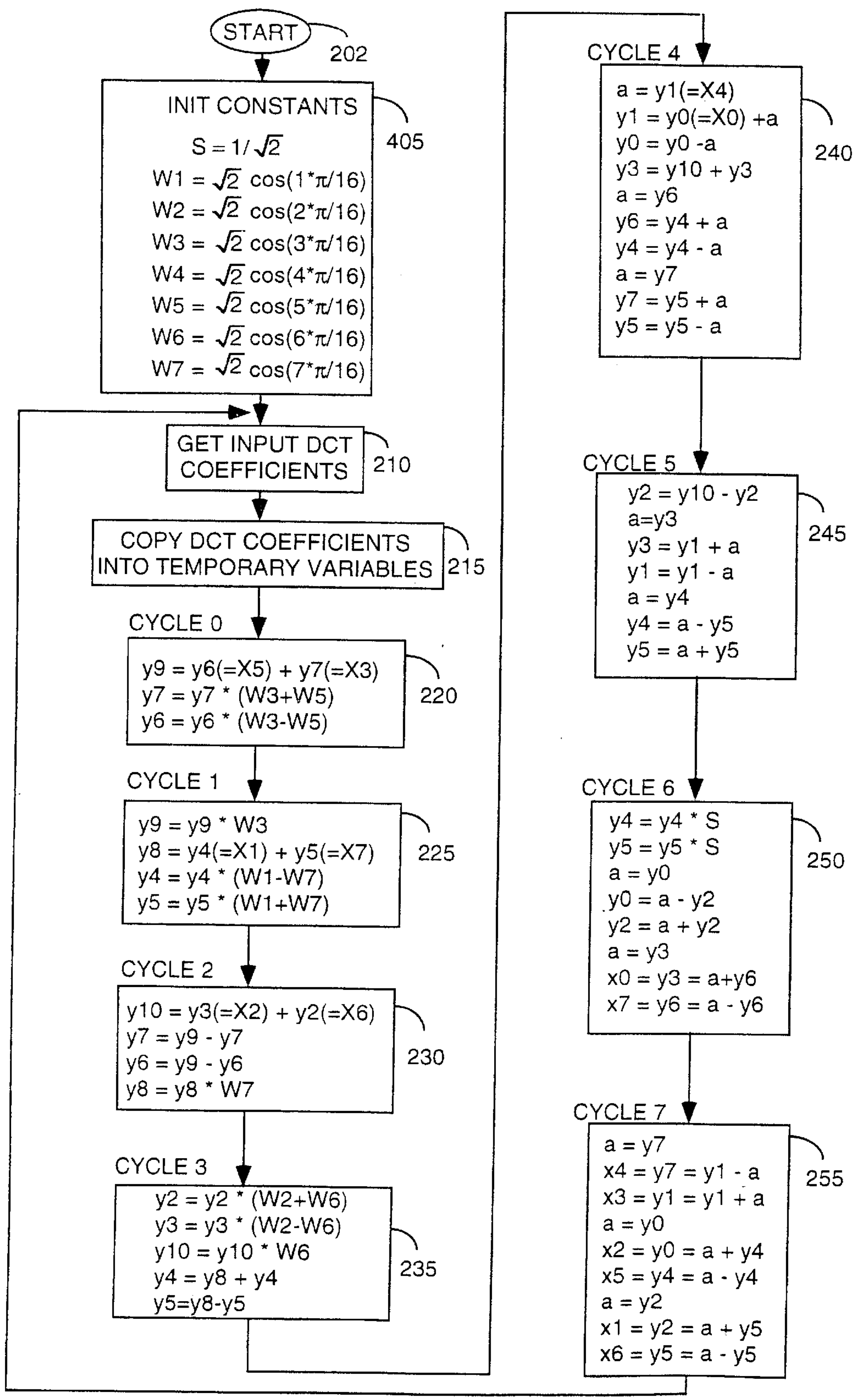
FIG. 4
START
202
INIT CONSTANTS
S = 1/√2
W1 = √2 cos(1*π/16)
W2 = √2 cos(2*π/16)
W3 = √2 cos(3*π/16)
W4 = √2 cos(4*π/16)
W5 = √2 cos(5*π/16)
W6 = √2 cos(6*π/16)
W7 = √2 cos(7*π/16)
405
GET INPUT DCT COEFFICIENTS
210
COPY DCT COEFFICIENTS INTO TEMPORARY VARIABLES
215
CYCLE 0
y9 = y6(=X5) + y7(=X3)
y7 = y7 * (W3+W5)
y6 = y6 * (W3-W5)
220
CYCLE 1
y9 = y9 * W3
y8 = y4(=X1) + y5(=X7)
y4 = y4 * (W1-W7)
y5 = y5 * (W1+W7)
225
CYCLE 2
y10 = y3(=X2) + y2(=X6)
y7 = y9 - y7
y6 = y9 - y6
y8 = y8 * W7
230
CYCLE 3
y2 = y2 * (W2+W6)
y3 = y3 * (W2-W6)
y10 = y10 * W6
y4 = y8 + y4
y5=y8-y5
235
CYCLE 4
a = y1(=X4)
y1 = y0(=X0) +a
y0 = y0 -a
y3 = y10 + y3
a = y6
y6 = y4 + a
y4 = y4 - a
a = y7
y7 = y5 + a
y5 = y5 - a
240
CYCLE 5
y2 = y10 - y2
a=y3
y3 = y1 + a
y1 = y1 - a
a = y4
y4 = a - y5
y5 = a + y5
245
CYCLE 6
y4 = y4 * S
y5 = y5 * S
a = y0
y0 = a - y2
y2 = a + y2
a = y3
x0 = y3 = a+y6
x7 = y6 = a - y6
250
CYCLE 7
a = y7
x4 = y7 = y1 - a
x3 = y1 = y1 + a
a = y0
x2 = y0 = a + y4
x5 = y4 = a - y4
a = y2
x1 = y2 = a + y5
x6 = y5 = a - y5
255

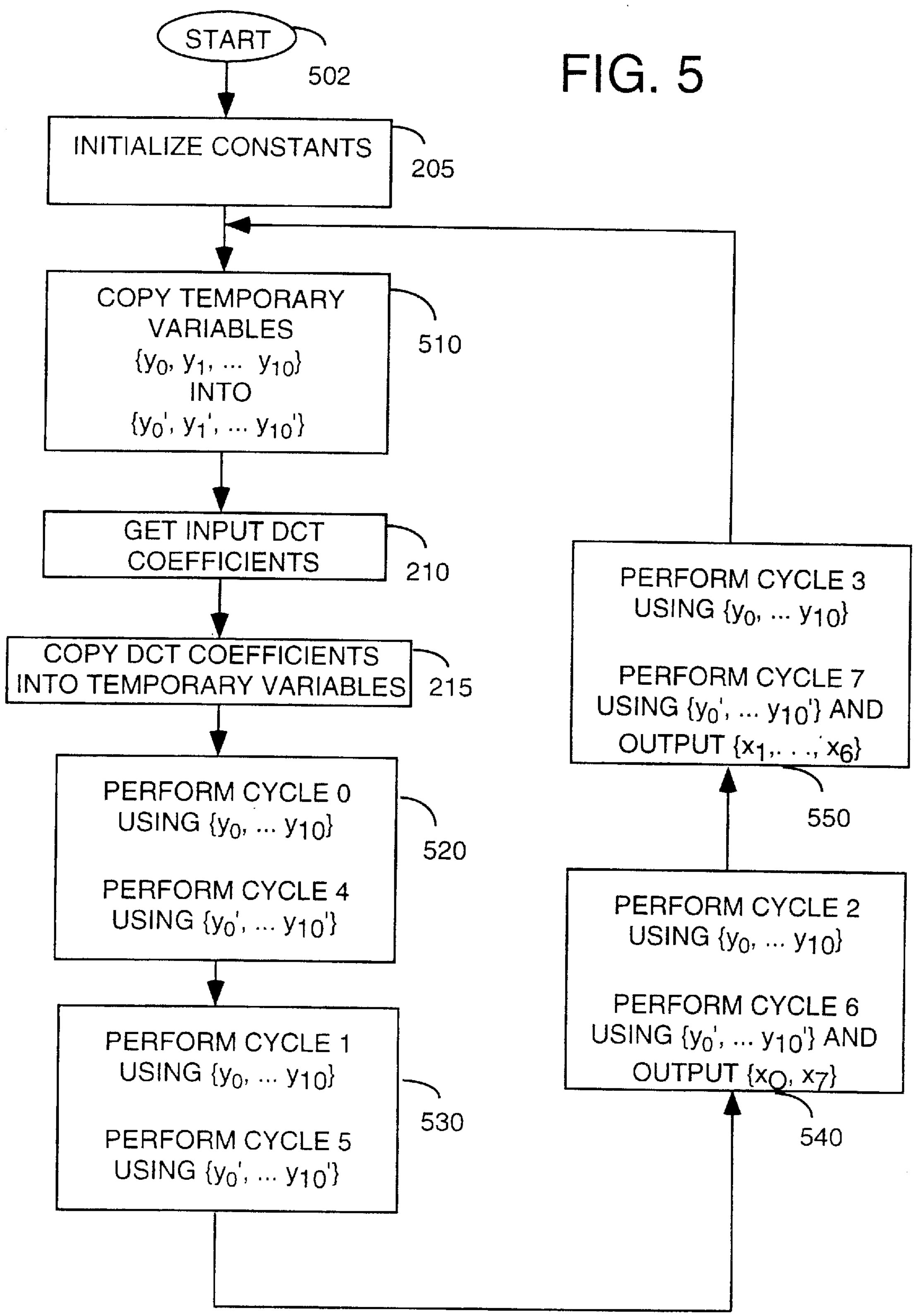

FIG. 5
START
502
INITIALIZE CONSTANTS
205
COPY TEMPORARY VARIABLES $\{y_0, y_1, \ldots y_{10}\}$ INTO $\{y_0', y_1', \ldots y_{10}'\}$
510
GET INPUT DCT COEFFICIENTS
210
COPY DCT COEFFICIENTS INTO TEMPORARY VARIABLES
215
PERFORM CYCLE 0 USING $\{y_0, \ldots y_{10}\}$
PERFORM CYCLE 4 USING $\{y_0', \ldots y_{10}'\}$
520
PERFORM CYCLE 1 USING $\{y_0, \ldots y_{10}\}$
PERFORM CYCLE 5 USING $\{y_0', \ldots y_{10}'\}$
530
PERFORM CYCLE 2 USING $\{y_0, \ldots y_{10}\}$
PERFORM CYCLE 6 USING $\{y_0', \ldots y_{10}'\}$ AND OUTPUT $\{x_0, x_7\}$
540
PERFORM CYCLE 3 USING $\{y_0, \ldots y_{10}\}$
PERFORM CYCLE 7 USING $\{y_0', \ldots y_{10}'\}$ AND OUTPUT $\{x_1, \ldots, x_6\}$
550

COMPUTATIONALLY EFFICIENT INVERSE DISCRETE COSINE TRANSFORM METHOD AND APPARATUS

This application claims the benefit of U.S. Provisional Application No. 60/084,632, filed May 7, 1998.

The invention relates to information processing systems generally and, more particularly, to a computationally efficient Inverse Discrete Cosine Transform (IDCT) method and apparatus.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

To achieve significant image compression, several of the above standards employ the discrete cosine transform (DCT) to convert pixel domain information into frequency domain information at an encoder. The frequency domain information is then compressed, and the compressed, or encoded, digital video information is transmitted to one or more decoders. The decoder(s) employ various decompression schemes including the inverse discrete cosine transform (IDCT) to retrieve the compressed, or encoded, digital video information. Thus, the DCT is applied in the compression of images, and an Inverse Discrete Cosine Transform (IDCT) is applied to the compressed images to recover the original images.

Many software-based algorithms for computing the IDCT have been devised. In digital video playback applications such as HDTV and DVD, however, it is essential that the decoding of the compressed video be performed very rapidly. In such applications hardware decoders are required, and therefore a hardware implementation of IDCT is needed as a component of these decoders. Two (conflicting) design objectives of a hardware IDCT implementation are to maximize throughput (i.e., the number of IDCT coefficients computed per clock cycle) while minimizing the total number of gates required for the computations. A hardware implementation that provides both high throughput and a low gate count is said to be efficient.

Although many good algorithms have been formulated for computing the IDCT in software, such as the Fast IDCT algorithm ("Fast Algorithms for Discrete W Transform and for the Discrete Fourier Transform," Zhongde Wang, *IEEE Trans. On Acoustics, Speech and Signal Processing*, Vol. ASSP-32, No. 4, pp. step 220–8120, August, 1984), such is not the case for IDCT hardware implementations. Unfortunately, a straightforward mapping of even a good software IDCT algorithm to hardware does not yield an efficient hardware implementation. The problem of intelligently mapping IDCT software algorithms to hardware has received little attention, and the few such mappings that have been proposed still do not result in particularly efficient hardware implementations. There is therefore a need in the art for an efficient hardware implementation for performing an IDCT; that is, an implementation that combines high throughput with low gate count.

SUMMARY OF THE INVENTION

The present invention is a method and apparatus for performing an Inverse Discrete Cosine Transform (IDCT). The method is based on an existing software IDCT algorithm called the Fast IDCT algorithm, which performs a series of 11 multiplications and 29 additions sequentially (i.e., 40 processing cycles) to produce a one-dimensional, eight coefficient IDCT. The method of the present invention, by contrast, operates in a computationally efficient manner to provide increased IDCT throughput with fewer processing steps. Specifically, the method and apparatus of the present invention produce a one-dimensional IDCT using eight processing cycles to perform the 11 multiplications and 29 additions.

Specifically, an apparatus for performing a one dimensional N-coefficient inverse discrete cosine transform (IDCT) an a set of DCT coefficients {X0, X1, . . . XN} to produce a set of IDCT coefficients {x0, x1, . . . xN}, where N is an integer, comprising: N adders, where each of the N adders produces a sum in response to two respective addends; M multipliers, where each of the M multipliers produces a product in response to two respective multiplicands, where M is an integer value less than N/2; a memory; and routing logic, coupled to the memory, the adders and the multipliers, for receiving the N DCT coefficients and for routing data between the memory and the adders and multipliers; the routing logic routing the data according to N processing cycles; the routed data including representations of the received DCT coefficients, intermediate operands produced by one or more of the adders and multipliers, and the IDCT coefficients; a first IDCT coefficient and an Nth IDCT coefficient being produced during an (N−1)th processing cycle; and a remaining plurality of IDCT coefficients being produced during an Nth processing cycle.

BRIEF DESCRIPTION OF THE DRAWINGS

The teachings of the present invention can be readily understood by considering the following detailed description in conjunction with the accompanying drawings, in which:

FIG. 4 depicts an alternate flow diagram of the method of FIG. 2; and

FIG. 5 depicts a flow diagram of a method for performing a pipelined IDCT according to the present invention.

DETAILED DESCRIPTION

Figure 1:
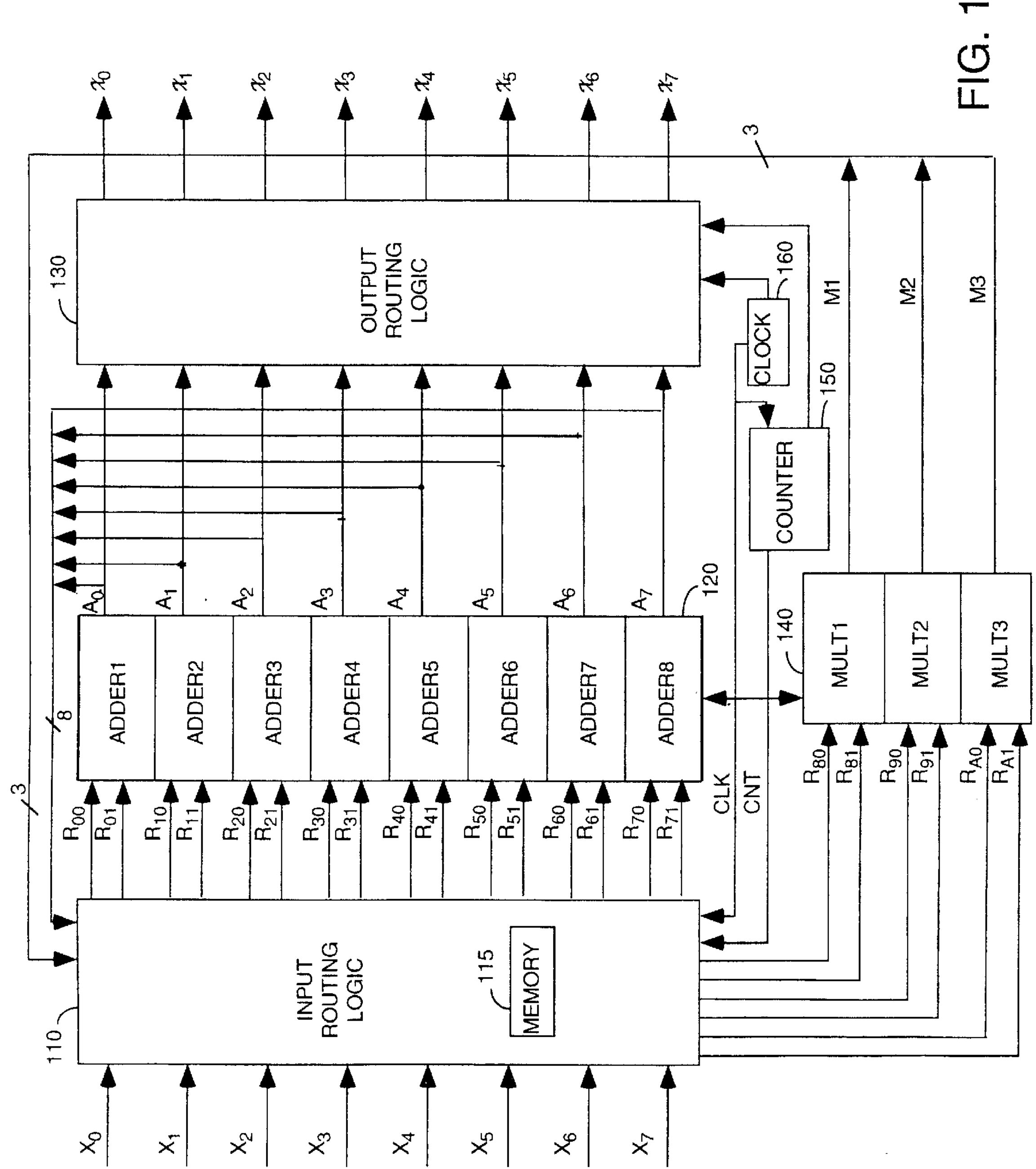
FIG. 1 depicts an apparatus for performing an inverse discrete cosine transform (IDCT) according to the present invention.

FIG. 1 depicts an apparatus for performing the method of the present invention. Specifically, the apparatus 100 of FIG. 1 accepts eight input discrete cosine transform (DCT) coefficients $\{X_0, X_1, X_2, X_3, X_4, X_5, X_6, X_7\}$ and responsively generates eight inverse discrete cosine transform (IDCT) coefficients $\{X_0, X_1, X_2, X_3, X_4, X_5, X_6, X_7\}$. The apparatus 100 includes an adder module 120 comprising, illustratively, eight two-operand adders; a multiplier module 140 comprising, illustratively, three two-operand multipliers; a first routing logic module 110 including a memory module 115; a counter 150, illustratively a 2-bit counter (pipelined method) or three bit counter (non-pipelined method); a clock module 160; and an optional second routing logic module 130.

The input DCT coefficients $\{X_0, X_1, X_2, X_3, X_4, X_5, X_6, X_7\}$ are received by routing logic module 110. In response to a control signal produced by clock module 160, routing logic module 110 routes the received coefficients to the inputs of appropriate adders (along signal paths $R_{00}$ through $R_{71}$) and/or multipliers (along signal paths $R_{80}$ through $R_{A1}$). The signal path utilized to route a coefficient is determined by the value of counter 150, as will be discussed in more detail below.

Each of the adders (ADDER1 through ADDER8) forming adder module 120 produces a respective output signal that is coupled to first routing logic module 110 and the second logic module 130 via respective signal paths A0 through A8. Similarly, each of the multipliers (MULT1 through MULT3) forming multiplier module 140 produces a respective output signal that is fed back to the first routing logic module 110 and the second logic module 130 via respective signal paths M0 through M3.

Memory 115 is used to store the intermediate values computed by the adders/multipliers and sent back to first routing logic module 110, as well as a plurality of constants that will be discussed in more detail below with respect to FIG. 2.

In operation, the first routing logic module 110 routes the values stored in memory 115 and, when present, the input coefficients $\{X_0, X_1, \ldots X_7\}$ along the various output signal paths $\{R_{00}, \ldots, R_{A1}\}$ based on the value of counter 150. At specified clock cycles, a plurality of the sums that are output from the adders along signal paths $A_1$ through $A_8$ exit the apparatus as final inverse transformed IDCT coefficients $\{x_0, x_1, \ldots X_7\}$.

Since some of the generated IDCT coefficients are output before others, the optional second routing logic module 130 may be used to sequence the output of IDCT coefficients such that a single IDCT coefficient block (e.g., a pixel block) is produced in response to the reception of a single DCT coefficient block. That is, the optional second routing logic module 130 is responsible for letting the proper sums among {A1, . . . , A8} exit as a particular subset of output values {x0, x1, x2, x3, x4, x5, x6, x7} at the proper clock cycles.

Figure 2:
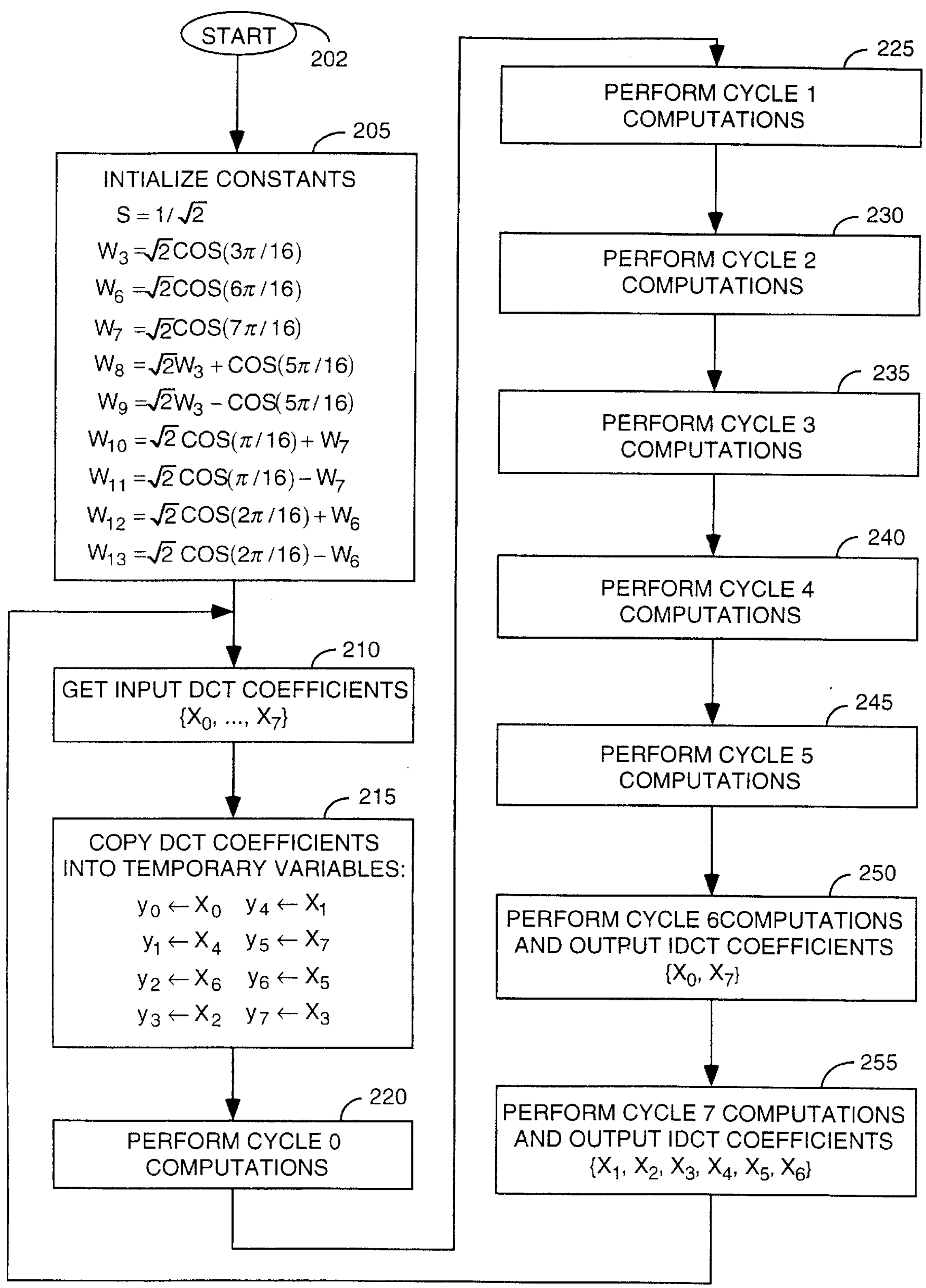
FIG. 2 depicts a flow diagram of a method for performing an IDCT according to the present invention.

FIG. 2 depicts a flow diagram of a method for performing an IDCT according to the present invention. The method is entered at step 202 and proceeds to step 205, where several constants are initialized as follows:

$S=1/\sqrt{\sqrt{2}}$

W1=(sqrt(2))cos(p/16)

W2=(sqrt(2))cos(2p/16)

W3=(sqrt(2))cos(3p/16)

W4=(sqrt(2))cos(4p/16)

W5=(sqrt(2))cos(5p/16)

W6=(sqrt(2))cos(6p/16)

W7=(sqrt(2))cos(7p/16)

W8=W3+W5=sqrt(2)(cos(3p/16)+cos(5p/16))

W9=W3−W5=sqrt(2)(cos(3p/16)−cos(5p/16))

W10=W1+W7=sqrt(2)(cos(p/16)+cos(7p/16))

W11=W1−W7=sqrt(2)(cos(p/16)−cos(7p/16))

W12=W2+W6=sqrt(2)(cos(2p/16)+cos(6p/16))

W13=W2−W6=sqrt(2)(cos(2p/16)−cos(6p/16))

It must be noted that the values of constants W1, W2, W4 and W5 are not explicitly stored; rather, they are used solely for constructing "compound" constants {W8, W9, W10, W11, W12, W13}.

The method 200 then proceeds to step 210, where input DCT coefficients {X0, X1, X2, X3, X4, X5, X6, X7} are received by, e.g., the first routing logic module 110 of the apparatus 100 of FIG. 1. The method 200 then proceeds to step 215, where the received DCT coefficients are copied to temporary variables {y0, y1, y2, y3, y4, y5, y6, y7} in the following manner (i.e., not by setting y0=X0, y1=X1, . . . , y7=X7, as might be expected. The exact mapping order may be modified as long as the following procedure is performed in a manner consistent with the actual mapping order.

Specifically, the temporary variables are initialized as follows: y0=X0, y1=X4, y2=X6, y3=X2, y4=X1, y5=X7, y6=X5, y7=X3. The method 200 then proceeds to step 215.

At step 220, a first set of addition and/or multiplication computations are performed on some of the temporary variables {y0, y1, y2, y3, y4, y5, y6, y7}; these computations are referred to as "Cycle 0" computations. For example, in the apparatus 100 of FIG. 1, the Cycle 0 computations are initiated when, e.g., a "000" output of the counter 150 is clocked into the first routing logic 110 via the output of the clock 160. In response to this clocking, the first routing logic 110 couples appropriate variables to the adder module 120 and/or the multiplier module 140, as will be described below with respect to FIGS. 3 and 4. The Cycle 0 computations result in a new set of values for temporary variables {y0, y1, y2, y3, y4, y5, y6, y7}, as well as two additional temporary variables y8 and y9. The method 200 then proceeds to step 225.

At step 225 a second set of addition and/or multiplication computations denoted as "Cycle 1" computations are performed on some of the temporary variables {y0, y1, y2, y3, y4, y5, y6, y7, y8, y9}, resulting in another new set of values for {y0, y1, y2, y3, y4, y5, y6, y7, y8, y9}. Again, in the apparatus 100 of FIG. 1, the Cycle 1 computations are initiated when a "001" output of the counter 150 is clocked into the first routing logic 110 via the output of the clock 160. In response to this clocking, the first routing logic 110 couples appropriate variables to the adder module 120 and/or the multiplier module 140, as will be described below with respect to FIGS. 3 and 4. The method 200 then proceeds to step 230.

At step 230 a third set of addition and/or multiplication computations denoted as "Cycle 2" computations are performed on some of the temporary variables {y0, y1, y2, y3, y4, y5, y6, y7, y8, y9}, resulting in another new set of values for {y0, y1, y2, y3, y4, y5, y6, y7, y8, y9}, as well as an additional temporary variable y10. In a similar fashion, the method 200 sequentially performs five additional sets of computations, denoted as, respectively, Cycle 3 (step 235), Cycle 4 (step 240), Cycle 5 (step 245), Cycle 6 (step 250)

and Cycle 7 (step 255). Each of the sets of addition and/or multiplication computations (i.e., steps 235 through 255) results in a new set of values which is then input to the following cycle.

After the Cycle 6 computations are completed, the variable y3 is output as IDCT coefficient x0, and the variable y6 is output as IDCT coefficient x7. Similarly, after the Cycle 7 computations are completed, the variable y7 is output as IDCT coefficient x4, the variable y1 is output as x3, the variable y0 is output as x2, the variable y4 is output as x5, the variable y2 is output as x1, and the variable y5 is output as x6. Thus, after Cycle 7 computations have been performed, all eight IDCT coefficients {x0, x1, x2, x3, x4, x5, x6, x7} have been computed and output. The method 200 then proceeds to step 210, where a new set of input DCT coefficients is received.

The computations and data manipulations for each of the above-described cycles (i.e. Cycle 0 through Cycle 7) will now be described in detail with respect to FIGS. 3 and 4. Specifically, FIG. 3 depicts a combination flow diagram and block diagram indicative of the apparatus of FIG. 1 as modified by the method of FIG. 2. That is, FIG. 3 depicts an exemplary utilization of the computational resources depicted in FIG. 1 for implementing the method of FIG. 2. Due to the complexity of FIG. 3, it has been broken into three "sub-figures," namely FIG. 3A, FIG. 3B and FIG. 3C. FIG. 3 is formed by arranging the FIGS. 3A, 3B and 3C according to the graphical depiction of the shown on FIG. 3A to produce a figure spanning three drawing pages. Reference designators that are used in both FIG. 3 and FIG. 2 have been defined previously with respect to FIG. 2.

Figure 3A:
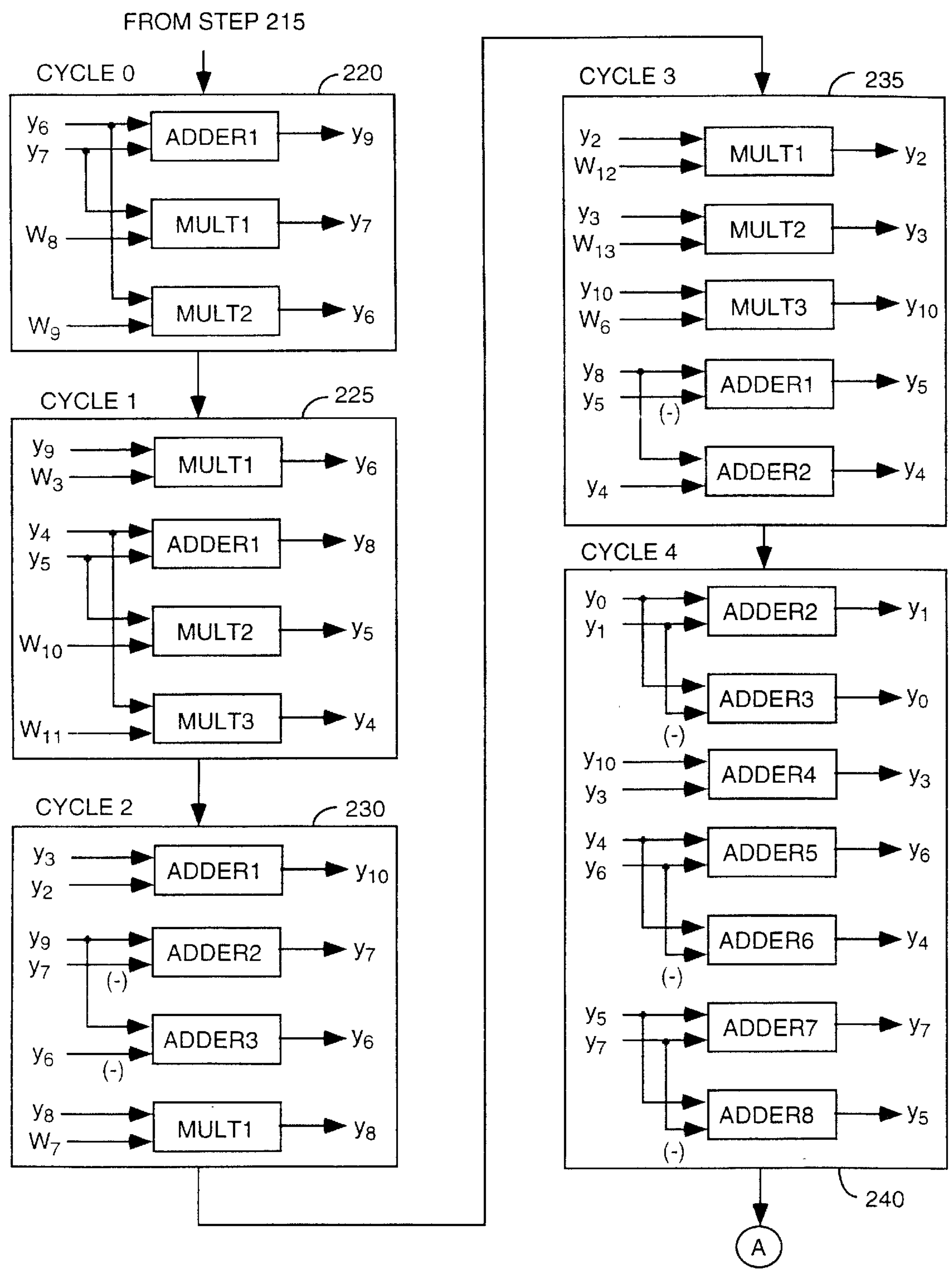
FIGS. 3A, B, and C depicts flow diagram indicative of the apparatus of FIG. 1 as modified by the method of FIG. 2.
Figure 3B:
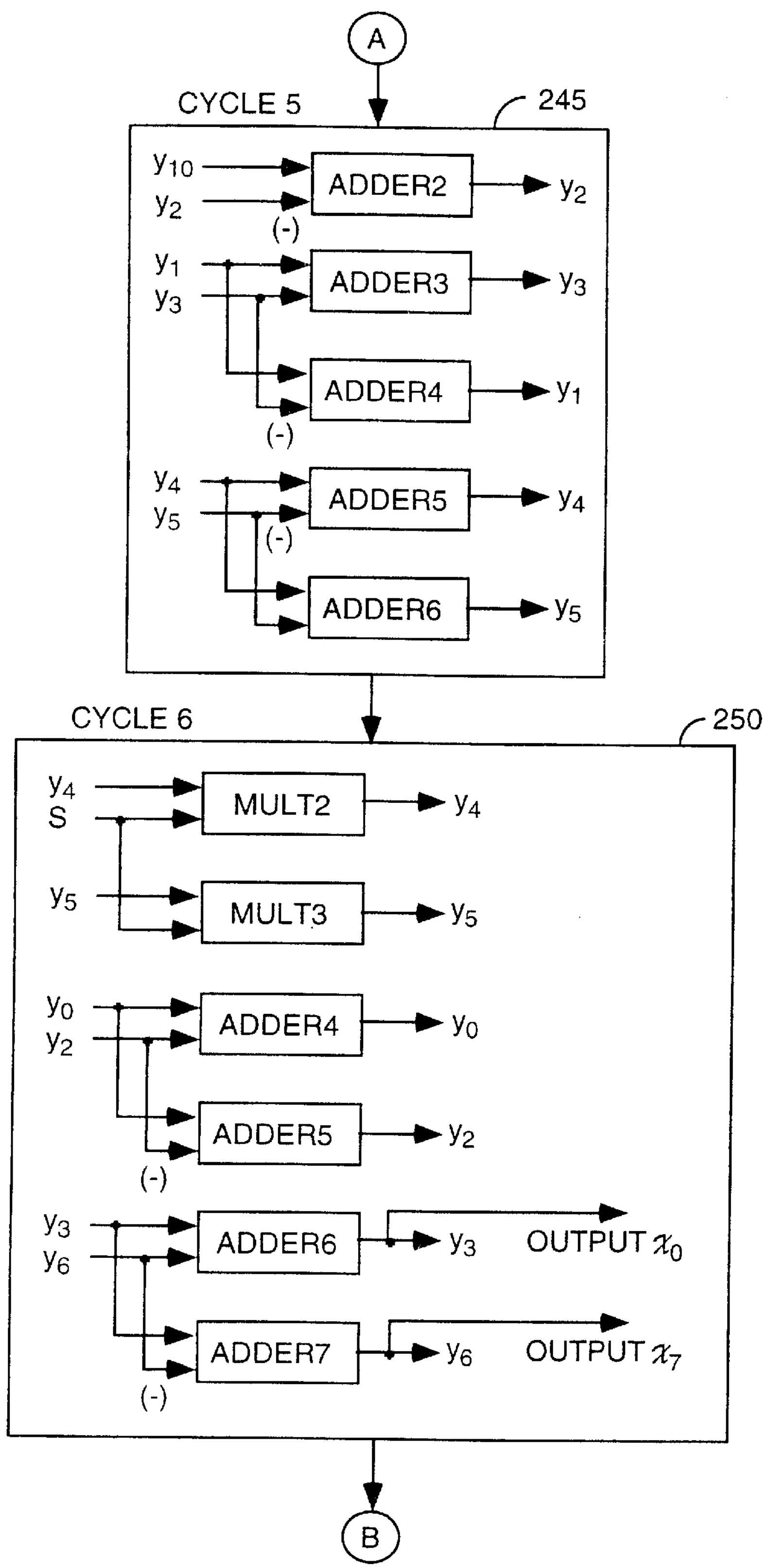
Figure 3:
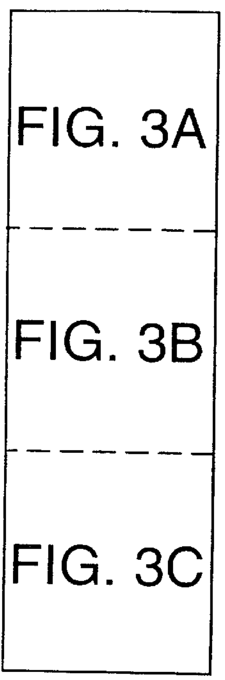
Figure 3C:
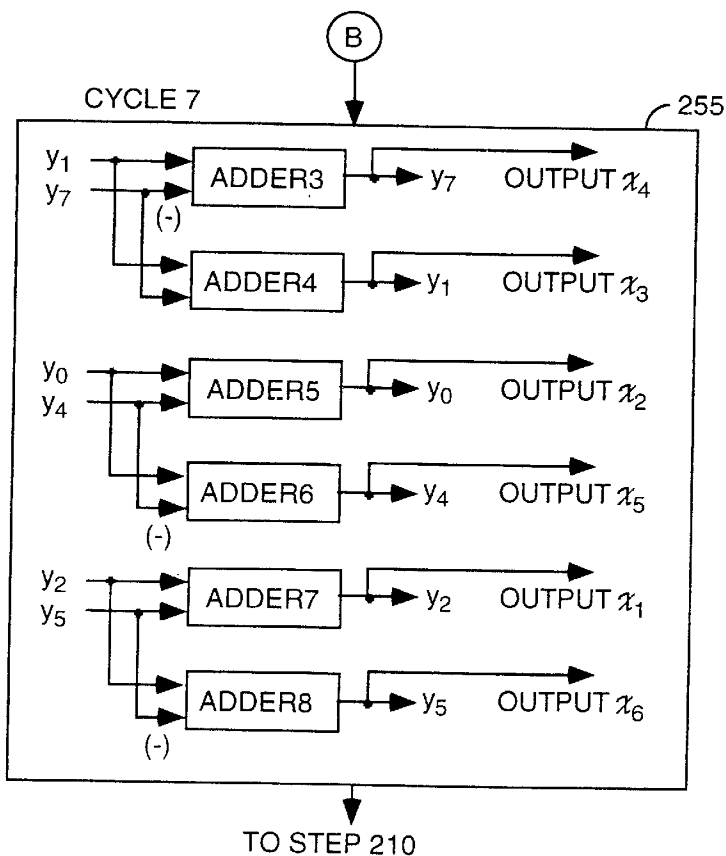

Referring now to FIG. 3A, the first step depicted is step 220. Since FIG. 3 represents the method of FIG. 2, steps 202 through 215 have been executed and the method 200 has now proceeded to step 220, where the Cycle 0 addition and/or multiplication computations are performed.

In Cycle 0 (step 220), first routing logic 110 couples variables $y_6$ and $y_7$ to respective inputs of ADDER1, variable $y_7$ and constant $W_8$ to respective inputs of MULT1, and variable $y_6$ and constant $W_9$ to respective inputs of MULT2. First routing logic 110 stores the output of ADDER1 as the variable $y_9$, stores the output of MULT1 as the variable $y_7$ and stores the output of MULT2 as the variable $y_6$.

In Cycle 1 (step 225), first routing logic 110 couples variable $y_9$ and constant $W_3$ to respective inputs of MULT1, variables $y_4$ and $y_5$ to respective inputs of ADDER1, variable $y_4$ and constant $W_{11}$ to respective inputs of MULT2, and variable $y_4$ and constant $W_{11}$ to respective inputs of MULT3. First routing logic 110 stores the output of MULT1 as the variable $y_9$, stores the output of ADDER1 as the variable $y_8$, stores the output of MULT2 as the variable $y_5$ and stores the output of MULT3 as the variable $y_4$.

In Cycle 2 (step 230), first routing logic 110 couples variables $y_3$ and $y_2$ to respective inputs of ADDER1, variable $y_9$ and inverted variable $y_7$ to respective inputs of ADDER2, variable $y_9$ and inverted variable $y_6$ to respective inputs of ADDER3, and variable $y_8$ and constant $W_7$ to respective inputs of MULT1. First routing logic 110 stores the output of ADDER1 as the variable $y_{10}$, stores the output of ADDER2 as the variable $y_7$, stores the output of ADDER3 as the variable $y_6$ and stores the output of MULT1 as the variable $y_8$.

In Cycle 3 (step 235), first routing logic 110 couples variable $y_2$ and constant $W_{12}$ to respective inputs of MULT1, variable $y_3$ and constant $W_{13}$ to respective inputs of MULT2, variable $y_{10}$ and constant $W_6$ to respective inputs of MULT3, variable $y_8$ and inverted variable $y_5$ to respective inputs of ADDER1, and variable $y_8$ and variable $y_4$ to respective inputs of ADDER2. First routing logic 110 stores the output of MULT1 as the variable of $y_2$, stores the output of MULT2 as the variable y3, stores the output of MULT3 as the variable $y_{10}$, stores the output of ADDER1 as the variable $y_5$ and stores the output of ADDER2 as the variable $y_4$.

In Cycle 4 (step 240), first routing logic 110 couples variables $y_0$ and $y_1$ to respective inputs of ADDER2, variables $y_0$ and inverted variable $y_1$ to respective inputs of ADDER3, variable $y_{10}$ and variable $y_3$ to respective inputs of ADDER4, variables $y_4$ and $y_6$ to respective inputs of ADDER5, variable $y_4$ and inverted variable $y_6$ to respective inputs of ADDER6, variable $y_5$ and variable $y_7$ to respective inputs of ADDER7, and variables $y_5$ and inverted variable $y_7$ to respective inputs of ADDER8. First routing logic 110 stores the output of ADDER2 as the variable $y_1$, the output of ADDER3 as the variable $y_0$, stores the output of ADDER4 as the variable $y_3$, stores the output of ADDERS as a variable $y_6$, stores the output of ADDER6 as a variable $y_4$, stores the output of ADDER7 as a variable $y_7$ and stores the output of ADDER8 as a variable $y_5$.

In Cycle 5 (step 245), first routing logic 110 couples variables $y_{10}$ and the inverted variable $y_2$ to respective inputs of ADDER2, variable $y_1$ and variable $y_3$ to respective inputs of ADDER3, variable $y_1$ and inverted $y_3$ to respective inputs of ADDER4, variable $y_4$ and inverted $y_5$ to respective inputs of ADDERS, and variable $y_4$ and variable $y_5$ to respective inputs of ADDER6. First routing logic 110 stores the output of ADDER2 as the variable $y_2$, stores the output of ADDER3 as the variable $y_3$, stores the output of ADDER4 as a variable $y_1$, stores the output of ADDER5 as a variable $y_4$ and stores the output of ADDER6 as a variable $y_5$.

In Cycle 6 (step 250), first routing logic 110 couples variable $y_4$ and constant S to respective inputs of MULT2, couples variable $y_5$ and constant S to respective inputs of MULT3, variables $y_0$ and $y_2$ to respective inputs of ADDER4, variables $y_0$ and inverted variable $y_2$ to respective inputs of ADDER5, variable $y_3$ and variable $y_6$ to respective inputs of ADDER6 and variable $y_3$ and inverted variable $y_6$ to respective inputs of ADDER7. First routing logic 110 stores the output of MULT2 as the variable $y_4$, stores the output of MULT3 as a variable $y_5$, stores the output of ADDER4 as a variable $y_0$, stores the output of ADDER5 as the variable $y_2$, stores the output of ADDER6 as the variable $y_3$ and stores the output of ADDER7 as the variable $y_6$. Additionally, the output of ADDER6 (stored as $y_3$) is coupled to the output as inverse DCT coefficient $x_0$, and the output of ADDER7 (stored as $y_6$) is coupled to the output as inverse DCT coefficient $x_7$. It should be noted that if optional second routing logic module 130 is used, then the output of adder 6 and adder 7 of cycle 6 are coupled to the second output routing logic module 130. Upon receiving all eight inverse DCT coefficients, output routing logic-second routing logic module 130 will provide, to the output, inverse DCT coefficients $x_0$ through $x_7$ (e.g., in response to a control signal from counter 150 as clocked by clock module 160).

In Cycle 7 (step 255), first routing logic 110 couples variables $y_1$ and inverted variable $y_7$ to ADDER3, variable $y_1$ and variable $y_7$ to ADDER4, variable $y_0$ and variable $y_4$ to ADDER5, variable $y_0$ and inverted variable $y_4$ to ADDER6, variable $y_2$ and variable $y_5$ to ADDER7 and variable $y_2$ and inverted variable $y_5$ to ADDER8. First routing logic 110 stores the output of ADDER3 as variable $y_7$, stores the output of ADDER4 as variable $y_1$, stores the output of ADDER5 as variable $y_0$, stores the output of ADDER6 as variable $y_4$, stores the output of ADDER7 as variable $y_2$ and stores the output of ADDER8 as variable $y_5$.

Additionally, the output of ADDER3(stored as $y_7$) is coupled to the output as inverse DCT coefficient $x_4$, the output of ADDER4 (stored as $y_1$) is coupled to the output as inverse DCT coefficient $x_3$, the output of ADDER5 (stored as $y_0$) is coupled to the output as inverse DCT coefficient $x_2$, the output of ADDER6 (stored as variable $y_4$) is coupled to the output as inverse DCT coefficient $x_5$, the output of ADDER7 (stored as variable $y_2$) is coupled to the output as inverse DCT coefficient $x_1$ and the output of ADDER8 (stored as variable $y_5$) is coupled to the output as inverse DCT coefficient $x_6$. It should be noted that, if optional second routing logic module 130 is used, the inverse DCT coefficients produced at step 255 are coupled to an output at the same time as the inverse DCT coefficients produced at Cycle 6, as previously described.

It is important to note that, similar to the initialization of temporary variables $\{y_0, y_1, y_2, y_3, y_4, y_5, y_6, y_7\}$, the copying of $\{y_0, y_1, y_2, y_3, y_4, y_5, Y_6, y_7\}$ to final output IDCT coefficients $\{x_0, x_1, x_2, x_3, x_4, x_5, x_6, x_7\}$ after Cycles 6 and 7 is not performed on a matching subscript basis.

FIG. 4 depicts a flow diagram of an exemplary embodiment of the method of FIG. 2. Specifically, FIG. 4 depicts a flow diagram including a more detailed description of the addition and/or multiplication computations performed in the various cycles in the method of FIG. 2. Unlike FIG. 3, the flow diagram of FIG. 4 utilizes a standard algorithmic notation to describe the addition and/or multiplication computations performed in the various cycles of the method of FIG. 2. It should be noted that an additional variable $\alpha$ is used in the algorithmic specification of the computations of Cycles 4–7. In addition, the computations are specified solely in terms of the basic constants $\{S, W_1, W_2, W_3, W_4, W_5, W_6, W_7\}$ (shown in the lower right hand side of the figure), rather than using the compound constants $\{W_8, W_9, W_{10}, W_{11}, W_{12}, W_{13}\}$ which were previously defined in order to simplify FIG. 3. As with FIG. 3, reference designators that are used in FIG. 4 and FIG. 2 have been defined previously with respect to FIG. 2.

The method of FIG. 4 is entered at step 202 and proceeds to step 405, where a group of constants are initialized as follows:

$S=1/\sqrt{\sqrt{2}}$

W1=(sqrt(2))cos(p/16)

W2=(sqrt(2))cos(2p/16)

W3=(sqrt(2))cos(3p/16)

W4=(sqrt(2))cos(4p/16)

W5=(sqrt(2))cos(5p/16)

W6=(sqrt(2))cos(6p/16)

W7=(sqrt(2))cos(7p/16)

The method 400 then proceeds to step 210, where the input DCT coefficients are retrieved. The method 200 then proceeds to step 215, where the input DCT coefficients are copied into temporary variables as previously described with respect to FIG. 2. The method then sequentially executes steps 220, 225, 230, 235, 240, 245, 250 and 255. Upon executing step 255, the method 200 proceeds to step 210. In the explanations of the various calculations for Cycles 0–7, the calculations associated with each cycle are performed in the order named. However, it will be known to those skilled in the art that different orders of calculations may be utilized within the context of the invention. That is, the mathematical symmetries within the IDCT method presented may be exploited by changing the cycles and/or intra-cycle calculation order.

In Cycle 0 (step 220), the variable $y_9$ is set equal to the variable $y_6$ plus the variable $y_7$. Additionally, the variable $y_7$ is set equal to $y_7$ times the quantity $(W_3+W_5)$, and the variable $y_6$ is set equal to the variable $y_6$ times the quantity $(W_3-W_5)$. It should be noted that the variable $y_6$ has previously been set equal to the input coefficient $X_5$, and the variable $y_7$ has previously been set equal to the input coefficient $X_3$.

In Cycle 1 (step 225), $y_9$ is set equal to $y_9$ times $W_3$; $y_8$ is set equal to $y_4$ plus $y_5$; $y_4$ is set equal to $y_4$ times the quantity ($W_1$ minus $W_7$); and $y_5$ is set equal to $y_5$ times the quantity $(W_1+W_7)$. It should be noted that the variable $y_4$ has previously been set equal to the input DCT coefficient $X_1$, and that the variable $y_5$ has previously been set equal to the input DCT coefficient $X_7$.

In Cycle 2 (step 230), variable $y_{10}$ is set equal to $y_3$ plus $y_2$; $y_7$ is set equal to $y_9$ minus $y_7$; $y_6$ is set equal to $y_9$ minus $y_6$; and $y_8$ is set equal to $y_8$ times $W_7$. It should be noted that the variable $y_3$ has previously been set equal to the input DCT coefficient $X_2$, and that the variable $y_2$ has previously been set equal to input DCT coefficient $X_6$.

In Cycle 3 (step 235), the variable $y_2$ is set equal to $y_2$ times the quantity $(W_2+W_6)$; the variable $y_3$ is set equal to $y_3$ times the quantity $(W_2-W_6)$; the variable $y_{10}$ is set equal to $y_{10}$ times $W_6$; the variable $y_4$ is set equal to $y_8$ plus $y_4$; and the variable $y_5$ is set equal to $y_8$ minus $y_5$.

In Cycle 4 (step 240), a variable $\alpha$ is set equal to $y_1$; $y_1$ is set equal to $y_0$ plus $\alpha$; $y_0$ is set equal to $y_0$ minus $\alpha$; $y_3$ is set equal to $y_{10}$ plus $y_3$; $\alpha$ is then set equal to $y_6$; $y_6$ is set equal to $y_4$ plus $\alpha$; $y_4$ is set equal to $y_4$ minus $\alpha$; $\alpha$ is then set equal to $y_7$; $y_7$ is set equal to $y_5$ plus $\alpha$; and $y_5$ is set equal to $y_5$ minus $\alpha$. It should be noted that the variable $y_1$ has previously been set equal to the input DCT coefficient $X_4$, and that the variable $y_0$ has previously been set equal to the input DCT coefficient $X_0$.

In Cycle 5 (step 245), the variable $y_2$ is set equal to $y_{10}$ minus $y_2$; the variable $\alpha$ is set equal to $y_3$; the variables $y_3$ is set equal to $y_1$ plus $\alpha$; $y_1$ is set equal to $y_1$ minus $\alpha$; $\alpha$ is set equal to $y_4$; $y_4$ is set equal to $\alpha$ minus $y_5$; and $y_5$ is set equal to $\alpha$ plus $y_5$.

In Cycle 6 (step 250), the variable $y_4$ is set equal to $y_4$ times the constant S; $y_5$ is set equal to $y_5$ times the constant S; $\alpha$ is set equal to $y_0$; $y_0$ is set equal to $\alpha$ minus $y_2$; $y_2$ is set equal to $\alpha$ plus $y_2$; $\alpha$ is set equal to $y_3$; inverse DCT coefficient $x_0$ and variable $y_3$ are both set equal to $\alpha$ plus $y_6$; inverse DCT coefficient $x_7$ and variable $y_6$ are both set equal to $\alpha$ minus $y_6$.

In Cycle 7 (step 255), the variable $\alpha$ is set equal to $y_7$; inverse DCT coefficient $x_4$ and variable $y_7$ are both set equal to $y_1$ minus $\alpha$; the variables $X_3$ and $y_1$ are both set equal to $y_1$ plus $\alpha$; variable $\alpha$ is then set equal to $y_0$; inverse DCT coefficient $x_2$ and variable $y_0$ are both set equal to $\alpha$ plus $y_4$; inverse DCT coefficient $x_5$ and variable $y_4$ are both set equal to $\alpha$ minus $y_4$; the variable $\alpha$ is then set equal to $y_2$; inverse DCT coefficient $x_1$ and variable $y_2$ are then set equal to $\alpha$ plus $y_5$; and inverse DCT coefficient $x_6$ and variable $y_5$ are both set equal to $\alpha$ minus $y_5$.

FIG. 5 depicts a flow diagram of a method 500 for performing a pipelined IDCT according to the present invention. That is, the method 500 of FIG. 5 performs the same function as the method 200 described above with respect to FIG. 2. However, the method 500 of FIG. 5 utilizes a pipelined (i.e., parallel) processing technique to improve throughput of, e.g., the IDCT apparatus 100 of FIG. 1.

Briefly, the method 500 of FIG. 5 processes two sets of DCT coefficients simultaneously to effectively double IDCT processing throughput. In order to process two sets of coefficients in this pipelined manner, it is necessary to have two sets of temporary variables; thus, the pipelined version of the method uses a first set $\{y_0, y_1, y_2, y_3, y_4, y_5, y_6, y_7, y_8, y_9, y_{10}\}$, and a second set $\{y_0', y_1', y_2', y_3', y_4', y_5', y_6, y_7', y_8', y_9', y_{10}',\}$. The method will be described within the context of a "steady state" operating mode, whereby a first set DCT coefficients $C_1$ and a second set of DCT coefficients $C_2$ are processed simultaneously. It will be recognized by those skilled in the art that in an initial mode of operation (i.e., the first four processing cycles of the first set of DCT coefficients) any processing steps addressing a second set of DCT coefficients will not produce valid data. This is because a second set of DCT coefficients is not introduced until the first four processing cycles of the first set of DCT coefficients are completed.

The method 500 of FIG. 5 is entered at step 502 and proceeds to step 205, where a number of constants are initialized in the manner previously described with respect to FIG. 2. The method 500 then proceeds to step 510.

At step 510, each member of the second set of temporary variables $\{y_0', y_1', y_2', y_3', y_4', y_5', y_6', y_7', y_8', y_9', y_{10}', \alpha'\}$ is set equal to the corresponding member of the first set of temporary variables $\{y_0, y_1, y_2, y_3, y_4, y_5, y_6, y_7, y_8, y_9, y_{10}, \alpha\}$. The method then proceeds to step 210.

At step 210 the input DCT coefficients {X0, X1, X2, X3, X4, X5, X6, X7} are received by, e.g., the first routing logic module 110 of the apparatus 100 of FIG. 1. The method 500 then proceeds to step 215, where the received DCT coefficients are copied to temporary variables $\{y_0, y_1, y_2, y_3, y_4, y_5, y_6, y_7\}$ as previously discussed with respect to FIG. 2. The method 500 then proceeds to step 520.

At step 520 Cycle 0 computations are performed using the first set of variables $\{y_0, y_1, y_2, y_3, y_4, y_5, y_6, y_7, y_8, y_9, y_{10}\}$ and, concurrently, Cycle 4 computations are performed using the second set of variables $\{y_0', y_1', y_2', y_3', y_4', y_5', y_6', y_7', y_8', y_9', y_{10}'\}$. As previously noted, valid data for the second set of variables will only be obtained if the method 500 has performed Cycles 0–3 on at least an initial set of DCT coefficients. The Cycle 0 and Cycle 4 computations are substantially the same as described above with respect to steps 220 and 240 of FIGS. 2–4. The method 500 then proceeds to step 530.

At step 530 Cycle 1 computations are performed using the first set of variables $\{y_0, y_1, y_2, y_3, y_4, y_5, y_6, y_7, y_8, y_9, y_{10}\}$ and, concurrently, Cycle 5 computations are performed using the second set of variables $\{y_0', y_1', y_2', y_3', y_4', y_5', y_6',', y_7', y_8', y_9', y_{10}'\}$. The Cycle 1 and Cycle 5 computations are substantially the same as described above with respect to steps 225 and 245 of FIGS. 2–4. The method 500 then proceeds to step 540.

At step 540 Cycle 2 computations are performed using the first set of variables $\{y_0, y_1, y_2, y_3, y_4, y_5, y_6, y_7, y_8, y_9, y_{10}\}$ and, concurrently, Cycle 6 computations are performed using the second set of variables $\{y_0', y_1', y_2', y_3', y_4', y_5', y_6', y_7', y_8', y_9', y_{10}'\}$. The Cycle 2 and Cycle 6 computations are substantially the same as described above with respect to steps 230 and 250 of FIGS. 2–4. After Cycle 6 is completed, the variable $y_3'$ is output as IDCT coefficient $x_0$, while the variable $y_6'$ is output as IDCT coefficient $x_7$, just as in the non-pipelined version of the method 200 depicted above with respect to FIGS. 2–4. The method 500 then proceeds to step 550.

At step 550 Cycle 3 computations are performed using the first set of variables $\{y_0, y_1, y_2, y_3, y_4, y_5, y_6, y_7, y_8, y_9, y_{10}\}$ and, concurrently, Cycle 7 computations are performed using the second set of variables $\{y_0', y_1', y_2', y_3', y_4', y_5', y_6', y_7', y_8', y_9', y_{10}'\}$. The Cycle 3 and Cycle 7 computations are substantially the same as described above with respect to steps 235 and 255 of FIGS. 2–4. After Cycle 7 is completed, the remaining six IDCT coefficients are output as follows: $x_1=y_2'$, $x_2=y_0'$, $x_3=y_1'$, $x_4=y_7'$, $x_5=y_4'$, and $x_6=y_5'$, just as in the non-pipelined version of the method depicted above with respect to FIGS. 2–4. The method 500 then proceeds to step 510.

At step 510, as previously described, each member of the second set of temporary variables $\{y_0', y_1', y_2', y_3', y_4', y_5', y_6', y_7', y_8', y_9', y_{10}', \alpha'\}$ is set equal to the corresponding member of the first set of temporary variables $\{y_0, y_1, y_2, y_3, y_4, y_5, y_6, y_7, y_8, y_9, y_{10}, \alpha\}$. Thus, after steps 520–540 have been performed for the first time (i.e., using a first set of DCT coefficients $C_1$) the first set of temporary variables $\{y_0, y_1, y_2, y_3, y_4, y_5, y_6, y_7, y_8, y_9, y_{10}, \alpha\}$ includes valid data while the second set of temporary variables $\{y_0', y_1', y_2', y_3', y_4', y_5', y_6', y_7', y_8', y_9', y_{10}', \alpha'\}$ includes invalid data. Thus, any inverse DCT output coefficients produces using the invalid data are discarded. The discarding of invalid data is handled, e.g., by the second routing logic module in response to the counter and clock control signals.

It is important to note the timing of the pipelined method 500 of FIG. 5. Specifically, each of steps 520, 530, 540 and 550 may be considered as occupying a single time unit, such that the entire method requires only four time units per iteration. The steps of copying (510 and 215) and fetching (210) are accomplished without affecting the overall timing framework.

Advantageously, in the case of an 8×8 IDCT system, the above described pipelined (500) and non-pipelined IDCT processing methods may be implemented using only eight adders and three multipliers as depicted above with respect to FIG. 1. Referring to FIG. 3, where an exemplary utilization of adders and multipliers is presented, it may be seen by inspection that no one step utilizes more than the available number of processing components. Moreover, the "paired" or pipelined steps (i.e., Cycles 0 and 4; 1 and 5; 2 and 6; and 3 and 7) do not together require, utilizes more than the available number of processing components.

Referring now to FIG. 1, the depicted apparatus 100 utilizes a 2-bit counter 150 in the case of implementing the pipelined method 500 described above with respect to FIG. 5. Thus, by taking advantage of the pipelined data flow, input coefficients $\{X_0, X_1, X_2, X_3, X_4, X_5, X_6, X_7\}$ are fed to the apparatus every four clock cycles (Cycles 0 and 4); and output coefficients $\{x_0, x_1, x_2, x_3, x_4, x_5, x_6, x_7\}$ leave the apparatus every third and fourth clock cycle (recall that coefficients are output in Cycles 6 and 7). The 2-bit counter 150 counts from 0 to 3. Thus, a count of zero triggers the first routing logic 110 to implement Cycle 0 and Cycle 4 operations (FIG. 5 step 520); a count of one triggers the first routing logic 110 to implement Cycle 1 and Cycle 5 operations (FIG. 5 step 530); a count of two triggers the first routing logic 110 to implement Cycle 2 and Cycle 6 operations (FIG. 5 step 540); and a count of three triggers the first routing logic 110 to implement Cycle 3 and Cycle 7 operations (FIG. 5 step 550). The value of counter 150 is passed to both the first and second routing logic modules 110 and 130 in order to effect the particular routings needed to carry out the operations of each cycle pair.

Memory element 115 holds the values of the temporary variables $\{y_0, y_1, y_2, y_3, y_4, y_5, y_6, y_7, y_8, y_9, y_{10}\}$ and $\{y_0', y_1', y_2', y_3', y_4', y_5', y_6', y_7, y_8', y_9', y_{10}\}$ and the constants $\{S, W_3, W_6, W_7, W_8, W_9, W_{10}, W_{11}, W_{12}$, and $W_{13}\}$. In each cycle, the routing logic module 110 routes the temporary variables and constants to the appropriate adders and/or multipliers based on the value of counter 150. When the counter has a value of 0, input coefficients $\{X_0, X_1, X_2, X_3, X_4, X_5, X_6, X_7\}$ are also routed to the appropriate adder/ multiplier inputs. Output values $\{A_1, A_2, \ldots, A_8\}$ and $\{M_1, M_2, M_3\}$ are then fed back to routing logic module 110, and the output values are copied into the appropriate locations in memory element 115, ready to be sent out along signal paths $\{R_{00}, R_{01}, \ldots, R_{A0}, R_{A1}\}$ at the next clock pulse. In addition to being fed back to routing module 110, adder outputs $\{A_1, A_2, \ldots, A_8\}$ are also sent to routing logic module 130. When counter 150 has value 2, routing logic module 130 will send the outputs of ADDER6 and ADDER7 out as IDCT coefficients $x_0$ and $x_7$, respectively. Similarly, when the counter has value 3, module 130 will send the outputs of ADDER3, ADDER4, . . . , ADDER8 out as IDCT coefficients $\{x_1, x_2, x_3, x_4, x_5, x_6\}$. Note that when counter 150 has value 0 or 1, routing module 130 does not send out output values to any of the IDCT coefficients $\{x_0, x_1, x_2, x_3, x_4, x_5, x_6, x_7\}$.

An additional feature of the method of this invention is that it can form the basis of a method for efficiently computing an 8×8 IDCT. An 8×8 IDCT is applied to an 8×8 matrix of input coefficients in two steps: first, the IDCT is applied to each row of the matrix, resulting in a new intermediate matrix; second, the IDCT is applied to each column of the intermediate matrix to produce the final 8×8 IDCT output matrix. Since input coefficients $X_0$ and $X_4$ are not needed by the method until Cycle 4 (FIG. 4), and the final computation of output coefficients $x_0$ and $x_7$ is completed in Cycle 6, one cycle ahead of the other output coefficients, it is possible to pipeline the eight rows of the input matrix, followed by the eight columns of the intermediate matrix, without any idle cycles during the transition from rows to columns. For example, a possible pipeline order is Row 7, Row 6, Row 5, Row 4, Row 3, Row 2, Row 1, Row 0, Column 0, Column 1, Column 2, Column 3, Column 4, Column 5, Column 6, Column 7. In this order, each of the 120 input sets is pipelined every four clock cycles with no idle cycles, resulting in a computation of the 8×8 IDCT in 2×8×4=64 clock cycles. The 64 coefficients of an 8×8 IDCT can therefore be computed in 64 clock cycles, giving a throughput of one 8×8 IDCT coefficient per cycle.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. Apparatus for performing a one dimensional N-coefficient inverse discrete cosine transform (IDCT) on a set of DCT coefficients {X0, X1, . . . XN} to produce a set of IDCT coefficients {x0, x1, . . . xN}, where N is an integer, comprising:

N adders, where each of said N adders produces a sum in response to two respective addends;

M multipliers, where each of said M multipliers produces a product in response to two respective multiplicands, where M is an integer value less than N/2;

a memory; and routing logic, coupled to said memory, said adders and said multipliers, for receiving said N DCT coefficients and for routing data between said memory and said adders and multipliers;

said routing logic routing said data according to N processing cycles;

said routed data including representations of said received DCT coefficients, intermediate operands produced by one or more of said adders and multipliers, and said IDCT coefficients;

a first IDCT coefficient and an Nth IDCT coefficient being produced during an (N−1)th processing cycle; and a remaining plurality of IDCT coefficients being produced during an Nth processing cycle.

2. The apparatus of claim 1, wherein N=8 and M=3.

3. The apparatus of claim 1, wherein:

said apparatus operates in a pipelined manner to perform a first one dimensional N-coefficient IDCT on said first set of DCT coefficients {X0, X1, . . . XN} and a second one dimensional N-coefficient IDCT on a second set of DCT coefficients {X0', X1', . . . XN'} to produce a set of IDCT coefficients {x0', x1', . . . xN'};

said routing logic routing data related to said first set of DCT coefficients {X0, X1, . . . XN} and routing data related to said second set of DCT coefficients {X0', X1', . . . XN'} according to respective processing cycles that separated by N/2 processing cycles.

4. The apparatus of claim 3, wherein N=8 and M=3.

5. The apparatus of claim 2, wherein said one dimensional IDCT is performed using 29 addition operations and eleven multiplication operations.

6. The apparatus of claim 4, wherein said one dimensional IDCT is performed using 29 addition operations and eleven multiplication operations.

7. A system for receiving a set of eight input coefficients {X0, X1, X2, X3, X4, X5, X6, X7} and responsively computing an inverse discrete cosine transform (IDCT) to produce a set of eight output coefficients {x0, x1, x2, x3, x4, x5, x6, x7}, comprising:

up to eight adders, where each of said adders produces a sum in response to two respective addends;

up to three multipliers, where each of said multipliers produces a product in response to two respective multiplicands;

a memory; and routing logic, for routing data between said memory, said adders and multipliers, said router routing said data in eight cycles, each of said eight cycles; wherein said routing logic routing said data according to N processing cycles;

said routed data including representations of said received DCT coefficients, intermediate operands produced by one or more of said adders and multipliers, and said IDCT coefficients;

a first IDCT coefficient and an Nth IDCT coefficient being produced during a sixth processing cycle; and a remaining plurality of IDCT coefficients being produced during an eighth processing cycle.

8. The apparatus of claim 7, wherein:

a group of variables is defined as follows:

S=1/sqrt(2);
W1=sqrt(2) cos (1*π/16);
W2=sqrt(2) cos (2*π/16);
W3=sqrt(2) cos (3*π/16);
W4=sqrt(2) cos (4*π/16);
W5=sqrt(2) cos (5*π/16);
W6=sqrt(2) cos (6*π/16);
W7=sqrt(2) cos (7*π/16); and wherein said routing logic causes said received DCT coefficients {X0, X1, X2, X3, X4, X5, X6, X7} to be stored in said memory as respective variables {y0, y4, y3, y7, y1, y6, y2, y5}; and said routing logic couples said data between said memory, said adders and said multipliers such that said eight processing cycles are performed as follows:

in a first processing cycle, where y9 is a variable;
y9=y6+y7;
y7=y7*(W3+W5);
y6=y6*(W3−W5);

in a second processing cycle, where y8 is a variable;
y9=y9*W3;
y8=y4+y5;
y4=y4*(W1−W7);
y5=y5*(W1+W7);

in a third processing cycle, where y10 is a variable;
y10=y3+y2;
y7=y9−y7;
y6=y9−y6;
y8=y8*W7;

in a fourth processing cycle;
y2=y2*(W2+W6);
y3=y3*(W2−W6);
y10=y10*W6;
y4=y8+y4;
y5=y8−y5;

in a fifth processing cycle, where a is a variable;
a=y1;
y1=y0+a;
y0=y0−a;
y3=y10+y3;
a=y6;
y6=y4+a;
y4=y4−a;
a=y7;
y7=y5+a;
y5=y5−a;

in a sixth processing cycle;
y2=y10−y2
a=y3;
y3=y1+a;
y1=y1−a;
a=y4;
y4=a−y5;
y5=a +y5;

in a seventh processing cycle;
y4=y4*S;
y5=y5*S;
A=y0;
y0=a−y2;
y2=a+y2;
a=y3;
x0=y3=a+y6;
x7=y6=a−y6; and in an eighth processing cycle;
a=y7;
x4=y7=y1−a;
x3=y1=y1+a;
a=y0;
x2=y0=a+y4;
x5=y4=a−y4;
a=y2;
x1=y2=a+y5; and
x6=y5=a−y5.

9. The apparatus of claim 8, wherein:

said apparatus operates in a pipelined manner to perform a first one dimensional N-coefficient IDCT on said first set of DCT coefficients {X0, X1, . . . XN} and a second one dimensional N-coefficient IDCT on a second set of DCT coefficients {X0', X1', . . . XN'} to produce a set of IDCT coefficients {x0',x1', . . . xN'};

said routing logic routing data related to said first set of DCT coefficients {X0, X1, . . . XN} and routing data related to said second set of DCT coefficients {X0', X1', . . . XN'} according to respective processing cycles that separated by four processing cycles.

10. A method for use in a system for performing a one dimensional N-coefficient inverse discrete cosine transform (IDCT) on a set of DCT coefficients {X0, X1, . . . XN} to produce a set of IDCT coefficients {x0, x1, . . . xN}, where N is an integer, said system comprising:

N adders, where each of said N adders produces a sum in response to two respective addends;

M multipliers, where each of said M multipliers produces a product in response to two respective multiplicands, where M is an integer value less than N/2;

a memory; and routing logic, coupled to said memory, said adders and said multipliers, for receiving said N DCT coefficients and for routing data between said memory and said adders and multipliers;

said method comprising the steps of:

processing said a set of DCT coefficients {X0, X1, . . . XN} according to N processing cycles to produce said IDCT coefficients {x0, x1, . . . xN}, said routed data including representations of said received DCT coefficients, intermediate operands produced by one or more of said adders and multipliers, and said IDCT coefficients;

producing, during an (N−1)th processing cycle, a first IDCT coefficient and an Nth IDCT coefficient; and produced, during an Nth processing cycle, a remaining plurality of IDCT coefficients.

11. The method of claim 10, wherein N=8 and M=3.

12. The method of claim 11, wherein said one dimensional IDCT is performed using 29 addition operations and eleven multiplication operations.

13. In a system receiving a set of eight input coefficients {X0, X1, X2, X3, X4, X5, X6, X7} and responsively computing an inverse discrete cosine transform (IDCT) to produce a set of eight output coefficients {x0, x1, x2, x3, x4, x5, x6, x7}, a method comprising the steps of:

initializing a group of constants as follows:
S=1/sqrt(2);
W1=sqrt(2)cos(1*π/16);
W2=sqrt(2)cos(2*π/16);
W3=sqrt(2)cos(3*π/16);
W4=sqrt(2)cos(4*π/16);
W5=sqrt(2)cos(5*π/16);
W6=sqrt(2)cos(6*π/16);
W7=sqrt(2)cos(7*π/16);

storing, within a memory, said received DCT coefficients {X0, X1, X2, X3, X4, X5, X6, X7} as respective variables {y0, y4, y3, y7, y1, y6, y2, y5};

performing a first cycle of calculations as follows, where y9 is a variable;

y9=y6+y7;

y7=y7*(W3+W5);

y6=y6*(W3−W5);

performing a second cycle of calculations as follows, where y8 is a variable;

y9=y9*W3;

y8=y4+y5;

y4=y4*(W1−W7);

y5=y5*(W1+W7);

performing a third cycle of calculations as follows, where y10 is a variable;

y10=y3+y2;

y7=y9−y7;

y6=y9−y6;

y8=y8*W7;

performing a fourth cycle of calculations as follows;

y2=y2*(W2+W6);

y3=y3*(W2−W6);

y10=y10*W6;

y4=y8+y4;

y5=y8−y5;

performing a fifth cycle of calculations as follows, where a is a variable;

a=y1;

y1=y0+a;

y0=y0−a;

y3=y10+y3;

a=y6;

y6=y4+a;

y4=y4−a;

a=y7;

y7=y5+a;

y5=y5−a;

performing a sixth cycle of calculations as follows;

y2=y10−y2 a=y3;

y3=y1+a;

y1=y1−a;

a=y4;

y4=a−y5;

y5=a+y5;

performing a seventh cycle of calculations as follows;

y4=y4*S;

y5=y5*S;

A=y0;

y0=a−y2;

y

2=a+y2;

a=y3;

x0=y3=a+y6;

x7=y6=a−y6; and performing an eighth cycle of calculations as follows;

a=y7;

x4=y7=y1−a;

x3=y1=y1+a;

a=y0;

x2=y0=a+y4;

x5=y4=a−y4;

a=y2;

x1=y2=a+y5;

x6=y5=a−y5.

* * * * *

UNITED STATES PATENT AND TRADEMARK OFFICE

CERTIFICATE OF CORRECTION

PATENT NO. : 6,374,280 B1
DATED : April 16, 2002
INVENTOR(S) : Li

It is certified that error appears in the above-identified patent and that said Letters Patent is hereby corrected as shown below:

Column 3,
Line 10, please change all upper cases "X's" to lower case: -- x --.
Line 50, please change "$X_7$" to -- $x_7$ --.
Line 64, please change "S=1/√√2" to -- S=1/√2 --.

Column 5,
Line 47, please change "$y_4$ and constant $W_{11}$" to -- $y_5$ and constant $W_{10}$ --.

Column 6,
Line 4, please change "y3" to -- $y_3$ --.
Line 27, please change "ADDERS" to -- ADDER5 --.

Column 7,
Line 42, please change "S=1/√√2" to -- S=1/√2 --.

Column 10,
Line 61, please change "$y_{10}$" to -- $y_{10}$' --.

Column 16,
Lines 16 and 17, should be one line: -- y2=a+y2; --.

Signed and Sealed this

Twenty-first Day of January, 2003

JAMES E. ROGAN
*Director of the United States Patent and Trademark Office*